(12) United States Patent
Toyooka

(10) Patent No.: US 9,082,359 B2
(45) Date of Patent: Jul. 14, 2015

(54) PROJECTION DISPLAY APPARATUS HAVING AN OPTICAL ELEMENT PROJECTING MODULATED LIGHT, METHOD FOR CONTROLLING THE SAME, AND ELECTRONIC DEVICE

(75) Inventor: Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1309 days.

(21) Appl. No.: 12/355,010

(22) Filed: Jan. 16, 2009

(65) Prior Publication Data

US 2009/0189922 A1    Jul. 30, 2009

(30) Foreign Application Priority Data

Jan. 28, 2008  (JP) ................... 2008-016607

(51) Int. Cl.
| | |
|---|---|
| *G09G 3/36* | (2006.01) |
| *G09G 3/20* | (2006.01) |
| *G09G 3/34* | (2006.01) |
| *G09G 3/00* | (2006.01) |

(52) U.S. Cl.
CPC ............ *G09G 3/3648* (2013.01); *G09G 3/2022* (2013.01); *G09G 3/002* (2013.01); *G09G 3/2081* (2013.01); *G09G 3/3406* (2013.01); *G09G 2310/066* (2013.01); *G09G 2320/0633* (2013.01)

(58) Field of Classification Search
CPC .................................................. G09G 3/3406

USPC ............................ 345/102, 690; 23/102, 690
See application file for complete search history.

(56) References Cited

U.S. PATENT DOCUMENTS

| | | | |
|---|---|---|---|
| 7,126,617 B2 | 10/2006 | Yamamoto et al. | |
| 2002/0036610 A1* | 3/2002 | Ito et al. | ........................... 345/89 |
| 2003/0058195 A1* | 3/2003 | Adachi et al. | ................... 345/67 |
| 2004/0041781 A1* | 3/2004 | Sato et al. | ..................... 345/102 |
| 2006/0273988 A1 | 12/2006 | Yamamoto et al. | |
| 2007/0085817 A1* | 4/2007 | Chen et al. | .................... 345/102 |

FOREIGN PATENT DOCUMENTS

| | | |
|---|---|---|
| CN | 1588514 A | 3/2005 |
| EP | 0660593 A1 | 6/1995 |
| JP | H07212686 A | 8/1995 |
| JP | A-2002-221934 | 8/2002 |
| JP | A-2002-351431 | 12/2002 |
| JP | A-2003-302947 | 10/2003 |
| JP | 2007-148417 | 6/2007 |

* cited by examiner

*Primary Examiner* — William Boddie
*Assistant Examiner* — Andrew Schnirel
(74) *Attorney, Agent, or Firm* — Oliff PLC

(57) ABSTRACT

An image display apparatus includes a light-source driving circuit that drives a light source to cyclically change brightness. A control unit controls a pixel to turn on and off over a plurality of subfields in a field so that transmittance or reflectance in the pixel over the plurality of subfields in the field corresponds to a gray level specified for the pixel. The control unit also arranges the plurality of subfields such that two or more gray-level defining subfields maintain a predetermined relationship with respect to the cyclical change in brightness of the light source caused by drive of a light-source driving circuit.

20 Claims, 7 Drawing Sheets

PROJECTION DISPLAY APPARATUS HAVING AN OPTICAL ELEMENT PROJECTING MODULATED LIGHT, METHOD FOR CONTROLLING THE SAME, AND ELECTRONIC DEVICE

BACKGROUND

1. Technical Field

The present invention relates to a technique for improving characteristics in representing gradation by turning on or off a pixel over subfields into which one field is divided.

2. Related Art

As is well known, a display panel has a display element, such as a liquid crystal element, for each pixel and changes a transmittance or reflectance of light for each pixel. In recent years, a projection display apparatus (projector) that emits light to such a display panel to generate a reduced image and projects an enlarged image of the reduced image using an optical system is becoming popular. One example of a technique for representing shades of gray in a display panel is a technique for dividing one field into a plurality of subfields, turning on or off a display element (pixel) for each of the subfields, changing a proportion of a period of time when the pixel is in an on (or off) state in one field, and thereby representing shades of gray (see, for example, JP-A-2007-148417).

With the above technique, gradation is represented in accordance with the proportion of a period of time when a pixel is in an on (or off) state in one field, so only two values for on and off levels are required for a driving voltage for a display element. Accordingly, the above technique can achieve a simpler structure by, for example, eliminating a digital-to-analog (D/A) converting circuit, in comparison with the traditional voltage modulation scheme.

A light source for emitting light to a display panel is AC-driven to achieve long life. When the light source is AC-driven, because the luminance of light emitted is changed, even with subfields having the same period, the subfields have different transmittances (reflectances) when a pixel is turned on or off. This causes an adverse effect on characteristics for representing gradation.

SUMMARY

An advantage of some aspects of the invention is that it provides a technique for representing gradation by turning on or off a pixel over each of subfields into which one field is divided with a reduced adverse effect on characteristics therefor even when a light source is AC-driven.

According to an aspect of the invention, An image display apparatus includes a light source that emits light, a light-source driving circuit that drives the light source, a display panel that includes a plurality of pixels and that changes a transmittance or reflectance of the light emitted by the light source for each of the plurality of pixels, and a control unit. The control unit controls the display panel such that the transmittance or reflectance in each of the plurality of pixels has a value corresponding to an on or off state in accordance with a gray level specified for the pixel over each of a plurality of subfields into which one field is divided on a time line and arranges the plurality of subfields such that two or more gray-level defining subfields other than an adjusting subfield among the plurality of subfields maintains a predetermined relationship with respect to light-source driving circuit that drives the light source to cyclically change brightness. With this configuration, because the arrangement of the gray-level defining subfields maintains a predetermined relationship with respect to a change in luminance of the light source, gradation can be represented without being affected by the change in the lamp.

In this case, the control unit may arrange the subfields such that a shortest subfield that has a shortest period among the gray-level defining subfields is contained in time when a luminance of the light emitted from the light source has a minimum or maximum value. With this arrangement, characteristics for representing gradation in a darker side or lighter side can be improved.

In this case, that the adjusting subfield may preferably be arranged immediately before the shortest subfield. Furthermore, the control unit may preferably set the transmittance or reflectance of each of the pixels to a value corresponding to either one of the on and off states over the adjusting subfield irrespective of the gray level. If responsiveness in turning on or off a pixel in the shortest subfield is low, the actual transmittance or reflectance would be displaced depending on the immediately preceding state. In contrast, with the above configuration, irrespective of the gray level, the initial state in turning on or off in the shortest subfield can be made uniform. The invention can be directed to not only an image display apparatus but also a method for controlling the image display apparatus and, in turn, to an electronic device including the image display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
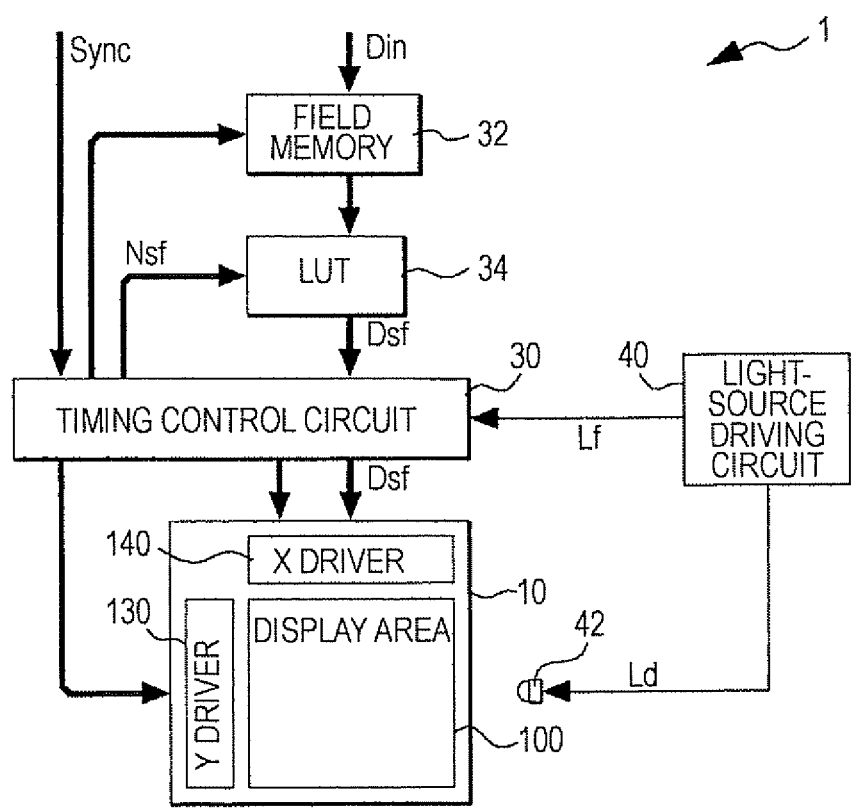
FIG. 1 is a block diagram that illustrates a configuration of an image display apparatus according to one embodiment of the invention.

An embodiment of the invention is described below with reference to the drawings. FIG. 1 is a block diagram that illustrates a configuration of an image display apparatus according to the present embodiment. As illustrated in this drawing, an image display apparatus 1 includes a display panel 10, a timing control circuit 30, a field memory 32, a look-up table (LUT) 34, a light-source driving circuit 40, and a light source 42.

Figure 2:
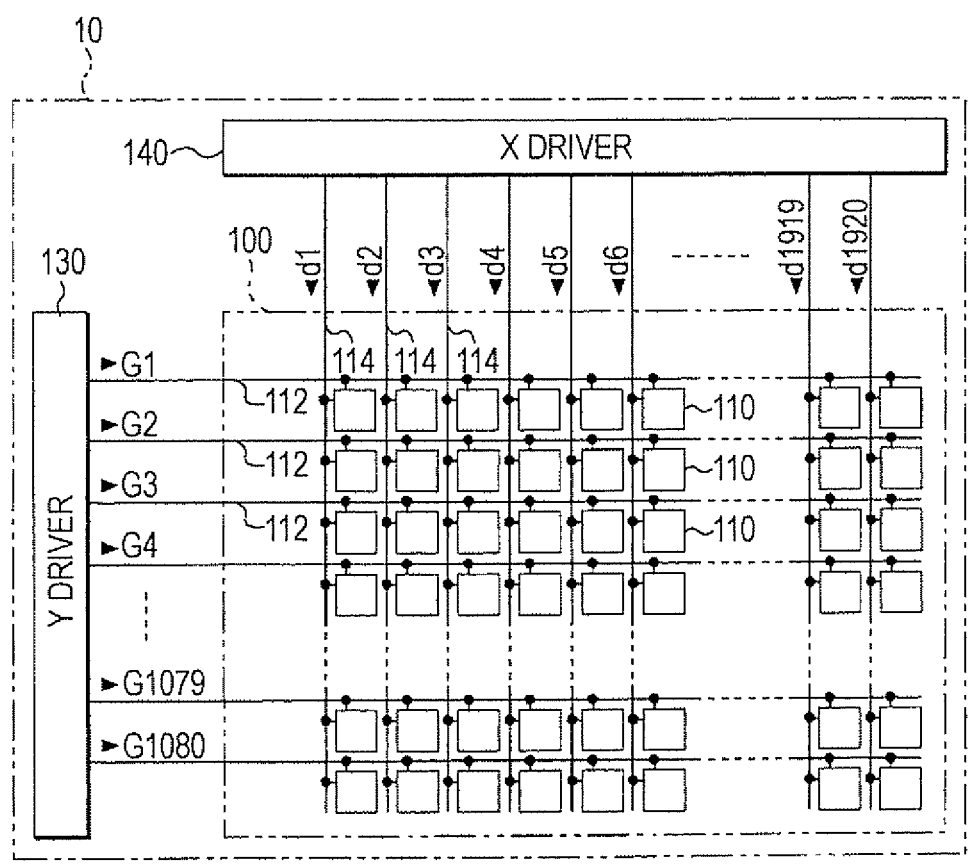
FIG. 2 illustrates a configuration of a display panel in the image display apparatus.

FIG. 2 illustrates a configuration of the display panel 10. The display panel 10 can be an active-matrix liquid-crystal panel, for example. In the display panel 10, a Y driver 130 and an X driver 140 are arranged in the vicinity of a display area 100. In the display area 100 in the present embodiment, 1080 scan lines 112 extend in a row direction (horizontally in the drawing) and 1920 data lines 114 extend in a column direction (vertically in the drawing). Each of the data lines 114 are electrically insulated from each of the scan lines 112. A pixel 110 is arranged so as to correspond to the intersection of each of the 1080 scan lines 112 and each of the 1920 data lines 114. In the present embodiment, the pixels 110 are arranged in a matrix with 1080 rows and 1920 columns. However, the invention is not intended to be limited to this arrangement.

Figure 3:
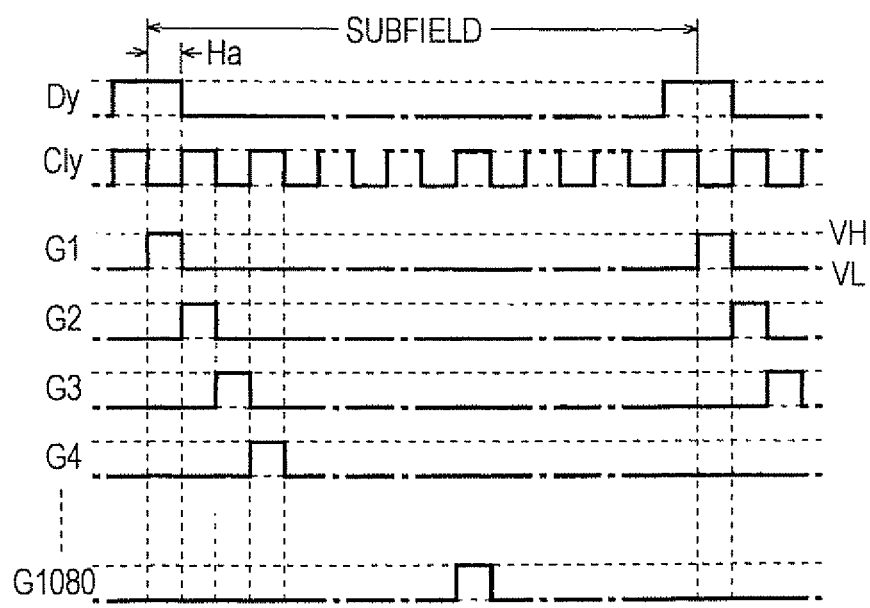
FIG. 3 illustrates an operation occurring in each subfield.

The Y driver 130 sequentially selects the 1080 scan lines 112, applies a voltage VH corresponding to an H level to a selected scan lines 112, and applies a voltage VL corresponding to an L level to the other unselected scan lines 112. More specifically, as illustrated in FIG. 3, the Y driver 130 supplies the 1st to 1080th scan lines 112 with scan signals G1 to G1080, respectively, being logic signals in which a start pulse Dy having a pulse width corresponding to one period of a clock signal Cly is delayed in sequence by half of the period of the clock signal Cly and the pulse width is reduced by one-half so as not to have an overlapping portion. The X driver 140 supplies the 1st to 1920th data lines 114 with data signals d1 to d1920 to be supplied to the pixels 110 at the selected scan line 112, respectively.

As is well known, for an active-matrix liquid-crystal panel, each of the pixels 110 has a liquid crystal element including liquid crystal disposed between a pixel electrode and a common electrode, and the liquid crystal element has a transmittance (in a transmissive display; for a reflective display, a reflectance) in accordance with a stored voltage. Here, when a scan line 112 is in the H level, a data signal supplied to the data lines 114 is applied to the pixel electrode of each of the pixels 110 positioned in the scan line 112, and a difference voltage between the common electrode and the data signal is written therein. Because the voltage written in the pixel 110 is retained by the capacitive nature of the liquid crystal element even when the voltage of the scan line 112 is in the L level, that pixel 110 has a transmittance in accordance with the difference voltage written when the scan line 112 is in the H level. In the present embodiment, the liquid crystal elements operate in a normally black mode in which the transmittance has a minimum value when the stored voltage is zero and the transmittance gradually increases with an increase in the stored voltage.

In representing gradation using a traditional analog scheme, a data signal for a voltage modulated according to a gray level is written in a liquid crystal element. With this analog scheme, unevenness in displaying resulting from a wiring resistance may occur or an additional D/A converting circuit may be necessary. In the present embodiment, a data signal has two levels of an ON voltage for turning on a liquid crystal element and an OFF voltage for turning off the liquid crystal element. To represent gradation using only two levels of ON and OFF voltages for a liquid crystal element as described above, a driving process (subfield driving process) may be required in which one field being a fundamental period is divided into a plurality of subfields, a liquid crystal element is made to retain a difference voltage corresponding to an ON or OFF voltage on a subfield basis, a proportion of a period of time for the on (or off) state is changed in accordance with the gray level for each pixel. One field used herein is a time period required to create a single image and is constant at 16.7 milliseconds (the inverse of 60 Hz) being a period for a vertical scan signal contained in a synchronous signal Sync supplied from an external higher level circuit. In the present embodiment, one field is divided into subfields sf0 to sf18. The details thereof will be described later.

The timing control circuit 30 corresponds to a control unit. The timing control circuit 30 defines one field being a reference for use in driving the display panel 10 from a synchronous signal Sync supplied from an external higher level circuit (not shown) and a light-source control signal Lf, defines the start point of each of the subfields sf0 to sf18, and generates various signals for driving the display panel 10. Because the synchronous signal Sync contains a vertical scan signal Vsync defining a vertical scan of image data Din, the timing control circuit 30 in the present embodiment defines one field being the reference for use in driving the display panel 10 on the basis of the vertical scan signal Vsync.

The field memory 32 stores image data Din of at least one field under the control of the timing control circuit 30 and also reads the stored image data Din in units of the subfields sf0 to sf18. Here, the image data Din is digital data specifying levels of gray of the pixels 110 on a pixel basis and supplied from an external higher level circuit in synchronization with the synchronous signal Sync. More specifically, one frame of the image data Din for the 1080 rows×1920 columns is supplied in synchronization with vertical and horizontal scans defined by the synchronous signal Sync.

The LUT 34 is a table that stores data Dsf indicating on and off for combinations of levels of gray and subfields. More specifically, the table is used for converting a gray level defined by image data Din read from the field memory 32 into data Dsf defining ON or OFF for each of the subfields sf0 to sf18. Here, to converting into the data Dsf, in addition to the image data Din, information indicating what subfield corresponds thereto is necessary. Because of this, the timing control circuit 30 supplies the LUT 34 with data Nsf indicating a subfield number. Thus, the LUT 34 outputs the data Dsf corresponding to a gray level specified by the image data Din read form the field memory 32 and corresponding to a subfield indicated by the data Nsf.

Figure 4:
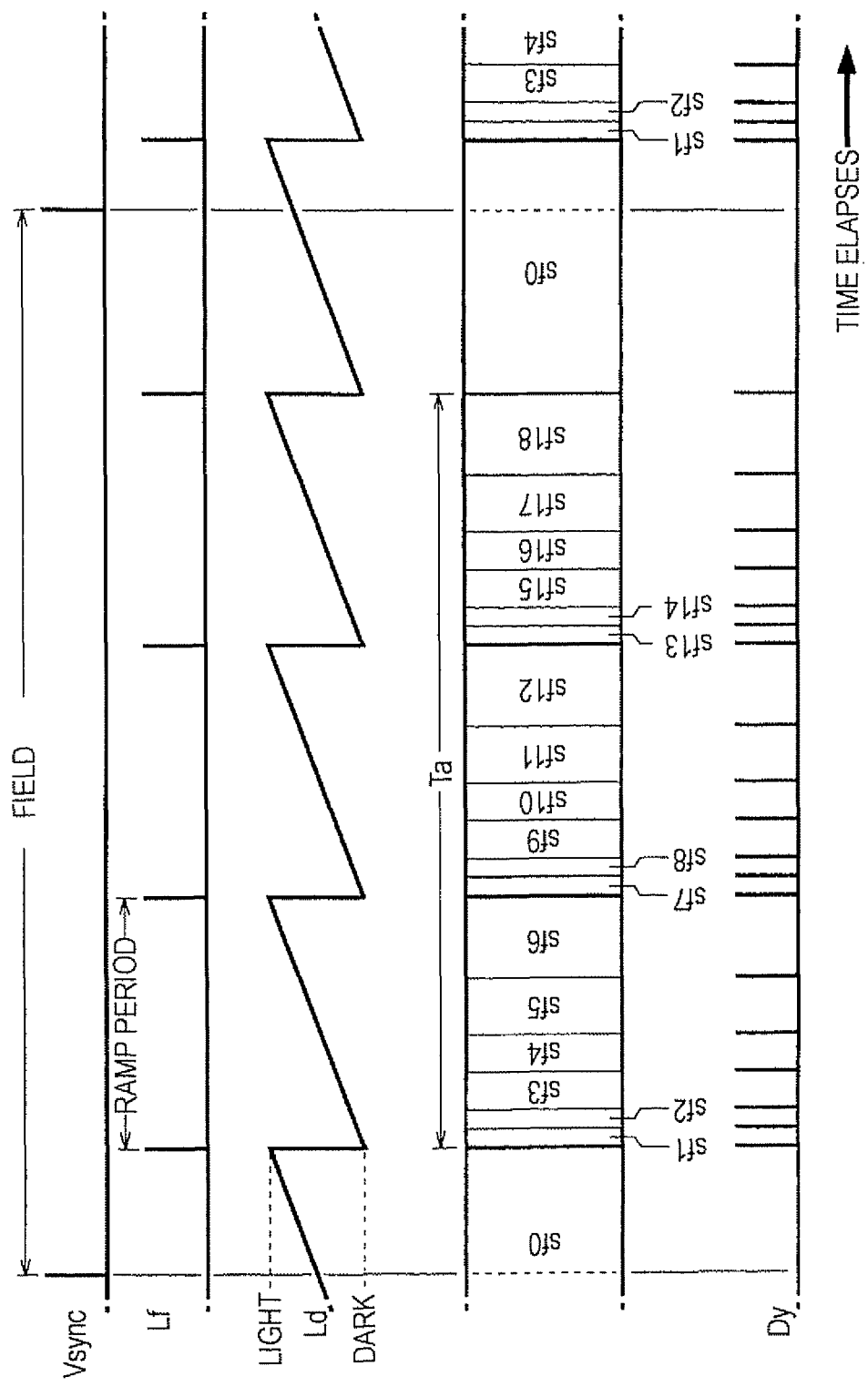
FIG. 4 illustrates a field structure in the display panel.

The light source 42 can be a high-pressure discharge lamp, for example, and emits white light to the display area 100. For achieving long life of the light source, it is necessary to AC-drive the light source 42 at a constant frequency. Because of this, the light-source driving circuit 40 generates a light-source driving signal Ld using a recommended frequency for the light source 42 and supplies it to the light source 42. In such a way, the light source 42 is AC-driven at its recommended frequency and thus has an increased life. Here, in the present embodiment, as illustrated in FIG. 4, the light-source driving signal Ld has a ramp waveform that linearly increases from a minimum value to a maximum value in a ramp period being the inverse of the recommended frequency. The light source 42 driven in response to the light-source driving signal Ld is in a relatively dark state at the point corresponding to the minimum value of the light-source driving signal Ld and in a relatively light state at the point corresponding to the maximum value. The light-source driving circuit 40 supplies the timing control circuit 30 with a light-source control signal Lf synchronized with the light-source driving signal Ld. The light-source control signal Lf is a pulse signal that becomes an H level when the light-source driving signal Ld changes from the maximum value to the minimum value.

The light-source driving signal Ld is constant for the recommended frequency of the light source 42, and that frequency is not synchronized with a synchronous signal Sync. Here, in the present embodiment, when the frequency of the light-source driving signal Ld is four or more times larger than the frequency of the vertical scan signal Vsync contained in the synchronous signal Sync, the light-source driving signal Ld becomes the minimum value at least three times in one field period. That is, when the period from the minimum value to the maximum value of the light-source driving signal Ld is one period, three continuous periods of the light-source driving signal Ld are always contained in one field period.

In the present embodiment, by the use of this, the timing control circuit 30 defines subfields in the display panel 10, as illustrated in FIG. 4. More specifically, in one field period defined by the vertical synchronization signal Vsync, the timing control circuit 30 uses a term Ta corresponding to the three continuous periods of the light-source control signal Lf (light-source driving signal Ld) starting from the time when a first pulse of the light-source control signal Lf is supplied, as the subfields sf1 to sf18 for defining levels of gray in the first row, and uses the other period as the subfield sf0 for adjustment in the first row. In other words, in one field period, the term Ta corresponding to the three continuous periods of the light-source control signal Lf is assigned to the gray-level defining subfields sf1 to sf18, and the arrangement of the subfields sf1 to sf18 is synchronized with respect to the light-source driving signal Ld. Because the light-source driving signal Ld is not synchronized with the synchronous signal Sync, the remaining of one field period other than the subfields sf1 to sf18 is assigned to the adjusting subfield sf0 and is used for adjusting the time (timing). Among the gray-level defining subfields sf1 to sf18, the subfields sf1, sf7, and sf13, which have the shortest time period, are arranged immediately after a pulse of the light-source control signal Lf is output, i.e., immediately after the light-source driving signal Ld is at the minimum value. The subfields at the second and subsequent rows have a relationship in which delays sequentially occur from the first row by the amount of sequential selection of the scan lines by the Y driver 130.

The details of conversion of such subfields performed by use of the LUT 34 are outlined below. That is, an off state is set in all of the subfields sf1 to sf18 for the darkest gray level; the sum of lengths of periods of subfields set in an on state increases as a lighter gray level is specified. Actual details of the conversion are experimentally determined in consideration of electrical optical properties and response properties of a liquid crystal element. In the present embodiment, the adjusting subfield sf0 is uniformly set in an off state, irrespective of the gray level specified by image data.

In such a configuration, the timing control circuit 30 defines a reference period in driving the display panel 10 in accordance with the vertical scan signal Vsync as one field, outputs a start pulse Dy at the point in time when a first pulse of the light-source control signal Lf is supplied after a pulse of the vertical scan signal Vsync is supplied, and outputs the start pulse Dy every time a time of period of each of the subfields sf1 to sf18 elapses after that point in time of supplying the first pulse. When the start pulse Dy is supplied, the Y driver 130 sequentially supplies the 1st, 2nd, 3rd, . . . , to 1080th scan lines 112 with the scan signals G1, G2, G3, . . . , G1080, respectively, being in an H level (selection voltage VH), as illustrated in FIG. 2.

In accordance with selection of a scan line 112 by the Y driver 130, the timing control circuit 30 reads image data elements Din for one row of pixels in the 1st to 1920th columns positioned in a scan line where the scan signal is in the H level. In the LUT 34, the image data elements Din for one row in that scan line are converted into the respective data elements Dsf corresponding to the subfield numbers indicated by the data elements Nsf. The timing control circuit 30 transfers the data elements Dsf obtained by the conversion corresponding to the pixels in the 1st to 1920th columns to the X driver 140. The X driver 140 reconverts the transferred data elements Dsf corresponding to the pixels in the 1st to 1920th columns into ON and OFF voltages indicated by the respective data elements Dsf, and supplies the voltages as the data signals d1 to d1920 to the 1st to 1920th data lines 114 in synchronism with the time when the scan signal for the corresponding row is turned to the H level under the control of the timing control circuit 30. When the scan line 112 has the selection voltage VH corresponding to the H level, the ON and OFF voltages supplied to the data lines 114 are applied to their respective pixel electrodes.

To prevent an alternating-current component from being applied to the liquid crystal, ON voltages have two polarities: positive and negative. These positive and negative polarities are alternately used for each field. Because of this, for example, when an ON voltage is specified in an odd-numbered field, the X driver 140 supplies the positive ON voltage, whereas when an ON voltage is specified in an even-numbered field, the X driver 140 supplies the negative ON voltage. Positive voltages and negative voltages used herein indicate voltages higher than and voltages lower than a voltage applied to the common electrode, respectively. An OFF voltage can be a voltage of the common electrode without the use of different polarities as long as the OFF voltage makes the difference voltage of the liquid crystal element zero.

An operation of supplying a data signal and writing it into a pixel in such a way is repeated every time the 1st to 1080th scan lines 112 are sequentially selected in each of the gray-level defining subfields sf1 to sf18 and the adjusting subfield sf0. Therefore, ON or OFF writing corresponding to their respective levels of gray is carried out in each of the pixels in the 1st to 1080th rows for each of the subfields sf1 to sf18, and OFF writing is uniformly carried out in the subfield sf0 irrespective of levels of gray.

In driving subfields in the normally black mode, when all the subfield are turned off in one field, the darkest level of gray is represented. A gray level one step lighter than the darkest level is represented by turning on one of the shortest subfields. Accordingly, in the normally black mode, the width of a level of gray represented in a darker side is determined by the shortest subfield period as long as the luminance of the light source is constant. In the present embodiment, the shortest subfields sf1, sf7, and sf13 are arranged in synchronization with the points in time when the luminance of the light source 42 is in the minimum level. Thus, without changing the length of a subfield period, a dark gray level can be represented by the amount of change in luminance of the light source.

If the length of the period of a subfield is short in writing ON or OFF in accordance with the gray level, the transmittance in that subfield may different depending on the ON or OFF state of an immediately preceding subfield because of its low response speed. For example, the actual transmittance in a subfield having a short period when a pixel is turned off in the case where the pixel was in an on state in the immediately preceding subfield is leaning to the on state than that in the case where the pixel was in an off state in the immediately preceding subfield. In the present embodiment, for the subfield sf0, OFF writing is uniformly carried out on all of the pixels, and the shortest subfield sf1 is positioned immediately after the subfield sf0. Accordingly, in the present embodiment, when a pixel is turned on or off in the subfield sf1, because the actual transmittance in the immediately preceding subfield sf0 is always off, gradation can be stably represented. Additionally, because uniformly turning off the pixels in the subfield sf0 makes the transmittance be in the minimum level, a change in luminance of the light source 42 is not actually identified. This can make a difference in levels of gray be less identifiable. When an image to be displayed is light averagely, the transmittance may be increased on the whole by turning on in the subfield sf0. In either case, pixels are uniformly turned on or off in the adjusting subfield sf0.

In a normally white mode, in contrast to the normally black mode, when pixels are turned off over all of the subfields in one field, the lightest gray level is represented. A level one step darker than the lightest level is represented by turning on one of the shortest subfields. Accordingly, in the normally white mode, the width of a level of gray represented in a lighter side is determined by the shortest subfield period. Therefore, the shortest subfields may be arranged in synchronization with the points in time when the light source 42 is lightest.

Figure 5:
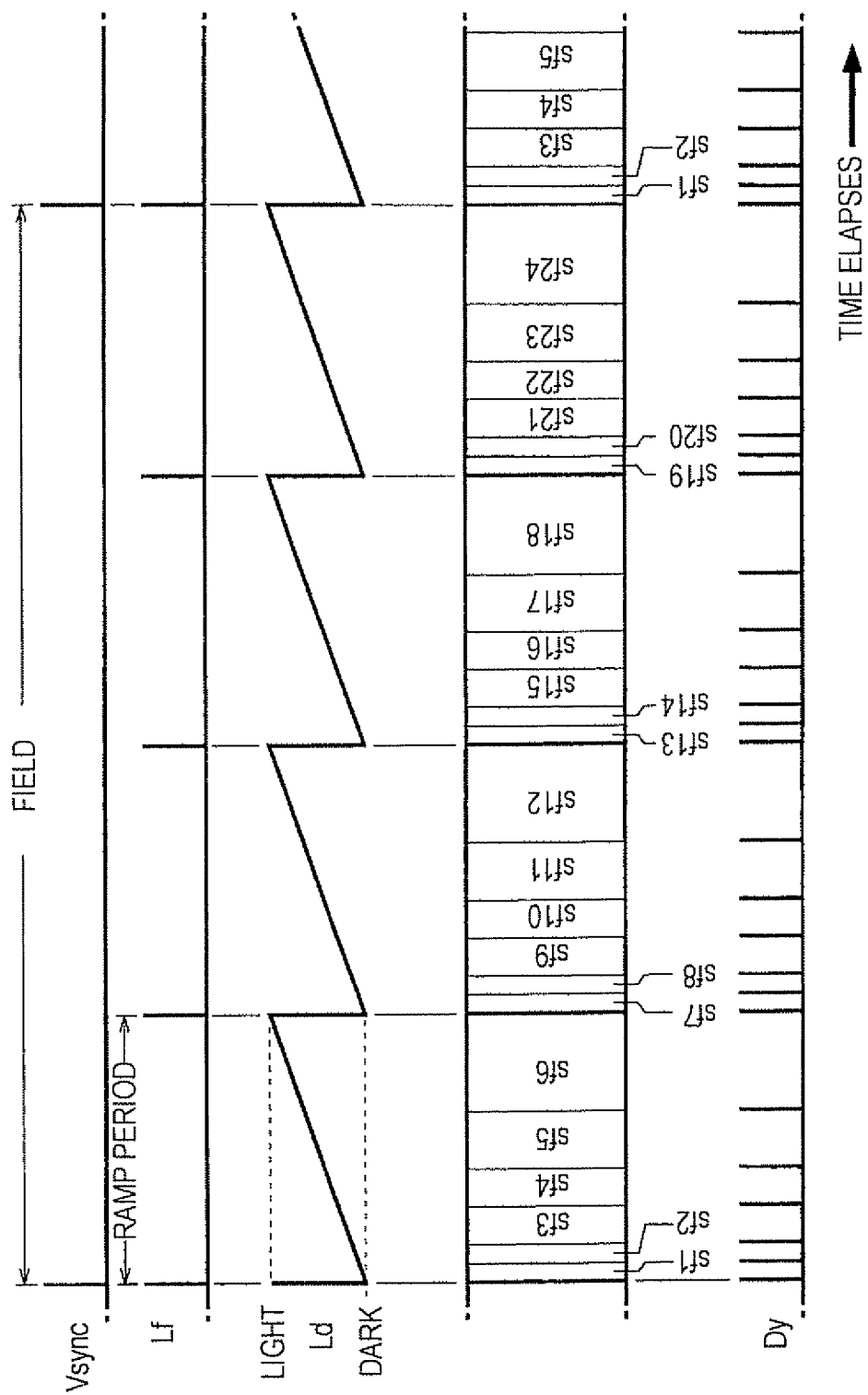
FIG. 5 illustrates another field structure in the display panel.

In the above embodiment, the recommended frequency for driving the light source 42 does not match a multiplied frequency of the vertical scan signal. However, the recommended frequency for driving the light source 42 may match a multiplied frequency of the vertical scan signal. The vertical scan for the display panel 10 is defined by the vertical synchronization signal Vsync. However, it may be determined so as to be a submultiple of the recommended frequency for driving the light source 42. In either case, when the recommended frequency for driving the light source 42 matches a multiple of the vertical scan frequency for the display panel 10, there is no need to have the adjusting subfield sf0, as illustrated in FIG. 5. Thus, it may be merely required that subfields be arranged such that the light-source control signal Lf is synchronized with the vertical scan signal Vsync, i.e., with a change in luminance of the light source 42.

Figure 6:
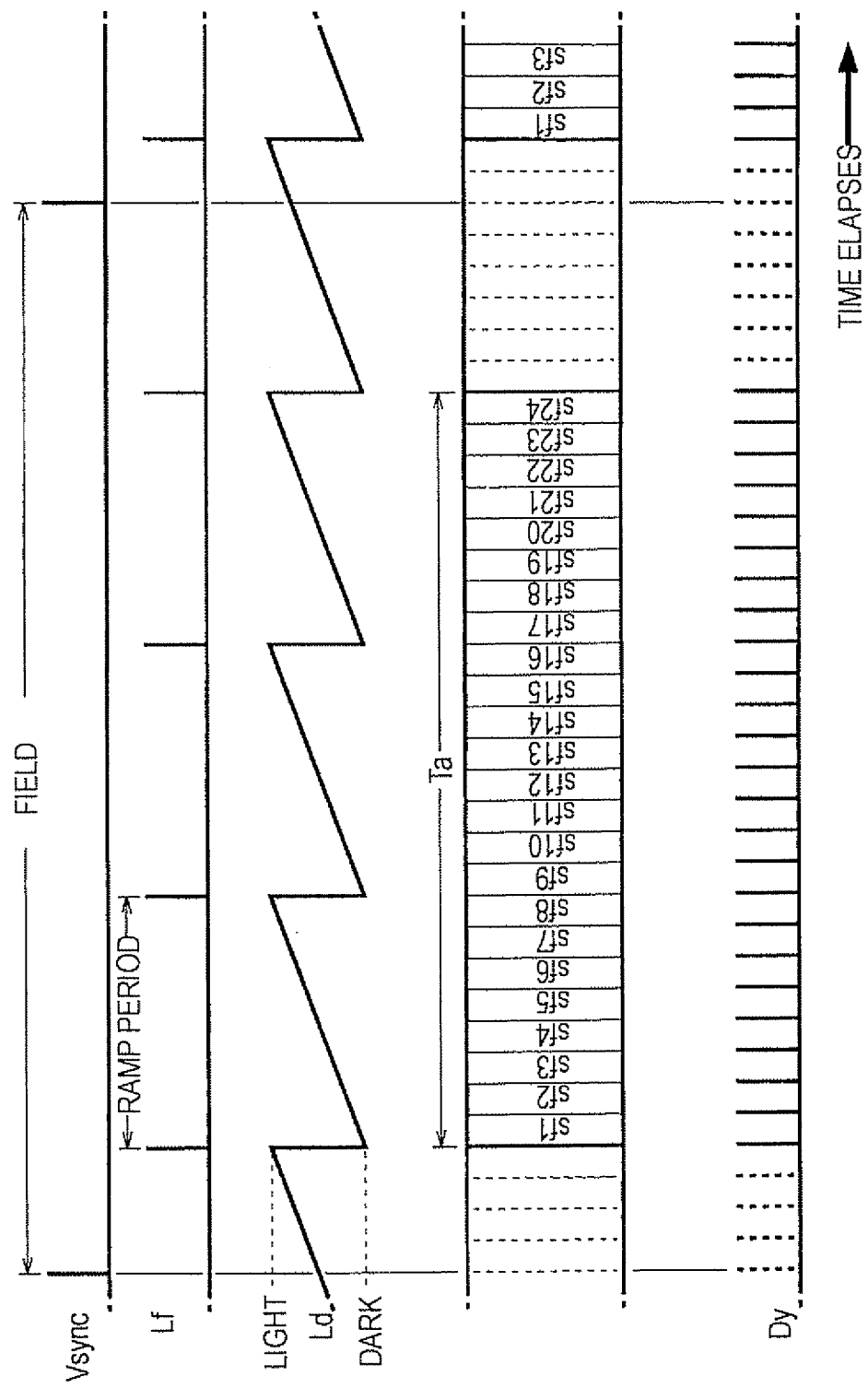
FIG. 6 illustrates still another field structure in the display panel.

In the above embodiment, the lengths of periods of subfields constituting one field are different. However, they may be the same. To have the same length in the subfields constituting one fields, as illustrated in FIG. 6, in one field period defined by the vertical scan signal Vsync, the term Ta corresponding to n continuous periods of the light-source control signal Lf from when a first pulse of the light-source control signal Lf is supplied may be used as a gray-level defining subfield at the 1st row, and the other may be used as an adjusting subfield at the 1st row.

Further, in the above embodiment, the light-source driving signal Ld has a ramp waveform that rises from left to right. However, it may have other waveforms, such as a sinusoidal waveform or a triangular waveform. The light-source control signal Lf being a pulse signal output at the beginning of a ramp period may alternatively be digital data indicating the luminance of the light source. In addition to a liquid crystal panel, various kinds of panel may also be used as the display panel as long as the display panel needs a light source. For example, a digital mirror element may be used as the display panel.

Electronic Device

One example of an electronic device that uses an image display apparatus according to the above embodiment is a projector that uses the above-described display panel 10 as a light valve. The projector is described below with reference to FIG. 7, which is a plan view that illustrates a configuration of this projector. As illustrated in this drawing, a projector 2100 includes a lamp unit 2102 including a white light source, such as a halogen lamp, therein. Light emitted from the lamp unit 2102 is divided into light beams for three primary colors, red (R), green (G), and blue (B), by three mirrors 2106 and two dichroic mirrors 2108, and the beams are guided to light valves 10R, 10G, and 10B corresponding to the primary colors R, G, and B, respectively. Because the optical path of the beam for B is longer than those of the other colors R and G, the beam for B is guided through a relay lens system 2121 including an incident lens 2122, a relay lens 2123, and an exit lens 2124.

In the projector 2100, three sets of image display apparatuses each including the display panel 10 are disposed for the colors R, G, and B. The projector 2100 has a configuration in which an image data element for each of the colors R, G, and B is supplied from an external higher level circuit. The configuration of each of the light valves 10R, 10G, and 10B is substantially the same as the display panel 10 in the above-described embodiment. The light valves 10R, 10G, and 10B are driven in a subfield basis in response to data signals for R, G, and B supplied from timing control circuits (not shown in FIG. 7) provided for the respective colors. The beams modulated by the light valves 10R, 10G, and 10B enter a dichroic prism 2112 from three respective directions. In the dichroic prism 2112, the beams for R and B are refracted by 90 degrees, whereas the beam for G travels in a straight line. Accordingly, after images for the colors are combined, a color image is projected onto a screen 2120 by a projection lens 2114.

There is no need to have a color filter in each of the light valves 10R, 10G, and 10B because the dichroic mirrors 2108 enable them to receive their respective beams corresponding to the primary colors R, G, and B. Images obtained by beams passing through each of the light valves 10R and 10B are projected after being reflected by the dichroic prism 2112, whereas an image obtained by a beam passing through the light valve 10G is projected as it is. Thus, the horizontal scan directions performed by the light valves 10R and 10B are opposite to the horizontal scan direction performed by the light valve 10G such that left-right reversed images are displayed.

Figure 7:
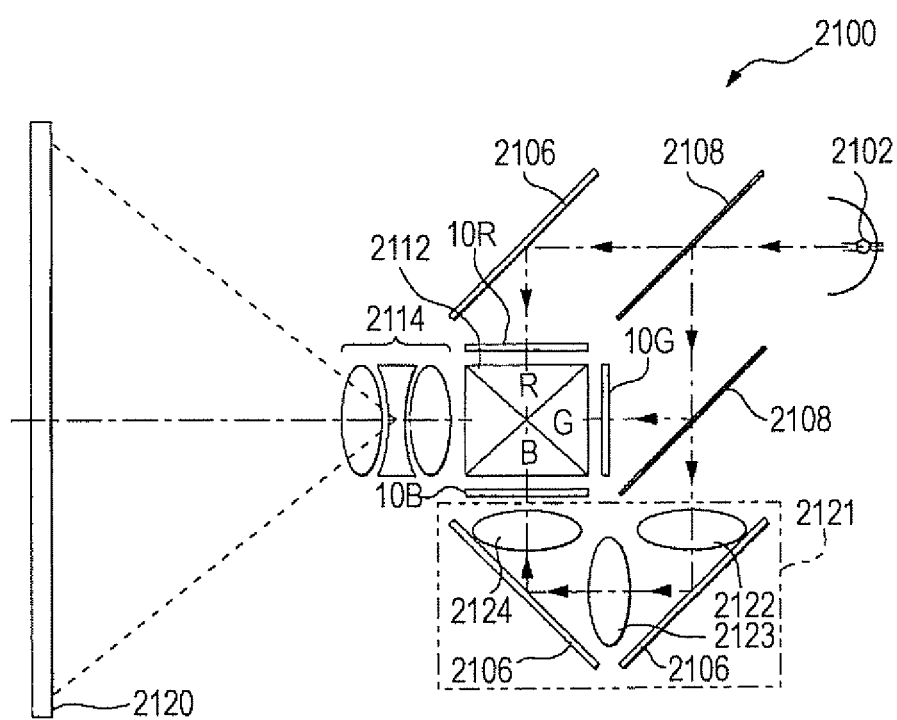
FIG. 7 illustrates a configuration of a projector that uses the image display apparatus.

Examples of the electronic device include, in addition to the projector illustrated in FIG. 7, a television, a viewfinder type or direct-view type video tape recorder, a car navigation system, a pager, an electronic organizer, a calculator, a word processor, a work station, a videophone, a point-of-sale (POS) terminal, a digital still camera, a cellular phone, and a device having a touch panel. An image display apparatus according to the invention can be used in these various electronic devices.

The entire disclosure of Japanese Patent Application No. 2008-016607, filed Jan. 28, 2008 is expressly incorporated by reference herein.

What is claimed is:

1. A projection display apparatus, comprising:
a light source that emits light;
a light-source driving circuit that drives the light source so that an amount of change of a brightness of the light per unit time cyclically changes;
a first light modulation element that modulates the light into a first modulated light corresponding to a first image data at each of a first combination of subfields in a field;
a second light modulation element that modulates the light into a second modulated light corresponding to a second image data at each of a second combination of subfields in the field; and
an optical element that (i) combines the first modulated light with the second modulated light into a combined light and (ii) projects the combined light,
the first combination of subfields including a first subfield and a second subfield, the second subfield being longer than the first subfield,
the second combination of subfields including a third subfield and a fourth subfield, the fourth subfield being longer than the third subfield,
the amount of change of the brightness of the light per unit time including a first amount of change and a second amount of change, the second amount of change being different than the first amount of change, and
the first subfield and the third subfield being arranged at a position corresponding to a timing when the amount of change of the brightness of the light per unit time changes from the first amount of change to the second amount of change.

2. The projection display apparatus according to claim 1, the first subfield and the third subfield starting after changing from the first amount of change to the second amount of change.

3. The projection display apparatus according to claim 1, the first subfield being a shortest subfield in the first combination of subfields, and
the third subfield being a shortest subfield in the second combination of subfields.

4. The projection display apparatus according to claim 1, the first combination of subfields including a first adjusting subfield, the first adjusting subfield being arranged at a position just before the first subfield, and
the second combination of subfields including a second adjusting subfield, the second adjusting subfield being arranged at a position just before the third subfield.

5. A method for controlling a projection display apparatus including a light source that emits light, a light-source driving circuit that drives the light source so that an amount of change of a brightness of the light per unit time cyclically changes, a first light modulation element that modulates the light into a first modulated light corresponding to a first image data at each of a first combination of subfields in a field, a second light modulation element that modulates the light into a second modulated light corresponding to a second image data at each of a second combination of subfields in the field, and an optical element that combines the first modulated light with the second modulated light into a combines light and projects the combined light:
the first combination of subfields including a first subfield and a second subfield, the second subfield being longer than the first subfield,
the second combination of subfields including a third subfield and a fourth subfield, the fourth subfield being longer than the third subfield,
the amount of change of the brightness of the light source per unit time including a first amount of change and a second amount of change, the second amount of change being different than the first amount of change, and
the first subfield and the third subfield being arranged at position corresponding to a timing when the amount of change of the brightness of the light per unit time changes from the first amount of change to the second amount of change.

6. An electronic device including a projection display apparatus according to claim 1.

7. A projection display apparatus, comprising:
a light source that emits light;
a light source driving circuit that drives the light source so that an amount of change of a brightness of the light per unit time cyclically changes;
a first light modulation element that modulates the light into a first modulated light corresponding to a first image data at each of a first combination of subfields in a field;
a second light modulation element that modulates the light into a second modulated light corresponding to a second image data at each of a second combination of subfields in the field; and
a optical element that combines the first modulated light with the second modulated light into a combined light and projects the combined light;
the first combination of subfields including a first subfield and a second subfield, the second subfield being arranged at an adjacent position to the first subfield,
the second combination of subfields including a third subfield being a shortest subfield in the second combination of subfields,
the amount of change of the brightness of the light source per unit time including a first amount of change and a second amount of change; the second amount of change being different than the first amount of change, and
the first subfield and the third subfield being arranged at position corresponding to a timing when the amount of change of the brightness of the light source per unit time changes from the first amount of change to the second amount of change.

8. The projection display apparatus according to claim 7, the first subfield starting after changing from the first amount of change to the second amount of change.

9. The projection display apparatus according to claim 7, the first amount of change being amount of change when the brightness of the light source changes from dark to light, and
the second amount of change being amount of change when the brightness of the light source changes from light to dark.

10. An electronic device including the projection display apparatus according to claim 7.

11. The projection display apparatus according to claim 1, the first amount of change being amount of change when the brightness of the light source changes from dark to light, and
the second amount of change being amount of change when the brightness of the light source changes from light to dark.

12. A projection display apparatus, comprising:
a light source that emits light;
a light-source driving circuit that drives the light source so that a direction of change of a brightness of the light cyclically changes;
a first light modulation element that modulates the light into a first modulated light corresponding to a first image data at each of a first combination of subfields in a field;
a second light modulation element that modulates the light into a second modulated light corresponding to a second image data at each of a second combination of subfields in the field; and
an optical element that combines the first modulated light with the second modulated light into a combined light and projects the combined light,
the first combination of subfields including a first subfield and a second subfield, the second subfield being longer than the first subfield,
the second combination of subfields including a third subfield and a forth subfield, the forth subfield being longer than the third subfield,
the direction of change of the brightness of the light source including a first direction of change and a second direction of change, the second direction of change being different than the first direction of change, and
the first subfield and the third subfield being arranged at a position corresponding to a timing when the direction of change of the brightness of the light source changes from the first direction of change to the second direction of change.

13. The projection display apparatus according to claim 12, the first direction of change being amount of change when the brightness of the light source changes from dark to light, and
the second direction of change being amount of change when the brightness of the light source changes from light to dark.

14. A projection display apparatus, comprising:
a light source that emits light;
a light-source driving circuit that drives the light source so that a brightness of the light cyclically changes by a light-source driving signal;

a first light modulation element that modulates the light into a first modulated light corresponding to a first image data at each of a first combination of subfields in a field;

a second light modulation element that modulates the light into a second modulated light corresponding to a second image data at each of a second combination of subfields in the field; and an optical element that combines the first modulated light with the second modulated light into a combined light and projects the combined light, the first combination of subfields including a first subfield and a second subfield, the second subfield being longer than the first subfield, the second combination of subfields including a third subfield and a forth subfield, the forth subfield being longer than the third subfield, the light-source driving signal including a first period and a second period, the brightness of the light being increased during the first period and being decreased during the second period, and the first subfield and the third subfield being arranged at a position corresponding to a timing when the light-source driving signal changes from the first period to the second period.

15. The projection display apparatus according to claim 1, the first light modulation element being a first liquid-crystal panel, and
the second light modulation element being a second liquid-crystal panel.

16. The projection display apparatus according to claim 1, the first light modulation element being a first digital mirror element, and
the second light modulation element being a second digital mirror element.

17. The projection display apparatus according to claim 12, the first light modulation element being a first liquid-crystal panel, and
the second light modulation element being a second liquid-crystal panel.

18. The projection display apparatus according to claim 12, the first light modulation element being a first digital mirror element, and
the second light modulation element being a second digital mirror element.

19. The projection display apparatus according to claim 14, the first light modulation element being a first liquid-crystal panel, and
the second light modulation element being a second liquid-crystal panel.

20. The projection display apparatus according to claim 14, the first light modulation element being a first digital mirror element, and
the second light modulation element being a second; digital mirror element.

* * * * *